United States Patent
Mizrahi et al.

(10) Patent No.: US 10,244,047 B1
(45) Date of Patent: *Mar. 26, 2019

(54) HASH COMPUTATION FOR NETWORK SWITCHES

(71) Applicant: Marvell Israel (M.I.S.L) Ltd., Yokneam (IL)

(72) Inventors: Tal Mizrahi, Haifa (IL); Aviran Kadosh, Misgav (IL); Denis Krivitski, Nazareth Illit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 67 days.

This patent is subject to a terminal disclaimer.

(21) Appl. No.: 14/992,838

(22) Filed: Jan. 11, 2016

Related U.S. Application Data

(62) Division of application No. 12/537,078, filed on Aug. 6, 2009, now Pat. No. 9,237,100.

(Continued)

(51) Int. Cl.
*H04L 29/08* (2006.01)
*H04L 12/701* (2013.01)
*H04L 12/709* (2013.01)
*H04L 12/741* (2013.01)
*H04L 12/931* (2013.01)
*H04L 12/947* (2013.01)

(52) U.S. Cl.
CPC ........ *H04L 67/1023* (2013.01); *H04L 45/245* (2013.01); *H04L 45/00* (2013.01);
(Continued)

(58) Field of Classification Search
CPC ....... H04L 45/245; H04L 45/00; H04L 45/54; H04L 49/25; H04L 49/351; G06F 12/0813; G06F 13/4022
See application file for complete search history.

(56) References Cited

U.S. PATENT DOCUMENTS

| 5,032,987 A | 7/1991 | Broder et al. |
| 6,035,107 A | 3/2000 | Kuehlmann et al. |

(Continued)

FOREIGN PATENT DOCUMENTS

| WO | WO-2013017017 | 2/2013 |

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

(Continued)

*Primary Examiner* — Tom Y Chang

(57) ABSTRACT

A data unit is received at a first one of a plurality of network devices associated with a first one of the plurality of link aggregate groups. A hashing function is applied to the data unit to generate a first hash value, where the first hash value identifies a communication link in the first one of the plurality of link aggregate groups. The data unit is received at a second one of the plurality of network devices associated with a second one of the plurality of link aggregate groups. The hashing function is applied to the data unit to generate a second hash value that is distinct from the first value, where the second hash value identifies a communication link in a second one of the plurality of link aggregate groups along which the data unit is to be communicated.

19 Claims, 7 Drawing Sheets

Related U.S. Application Data

(60) Provisional application No. 61/086,641, filed on Aug. 6, 2008.

(52) U.S. Cl.
CPC .............. *H04L 45/54* (2013.01); *H04L 49/25* (2013.01); *H04L 49/351* (2013.01)

(56) References Cited

U.S. PATENT DOCUMENTS

| | | |
|---|---|---|
| 6,249,521 B1 | 6/2001 | Kerstein |
| 6,363,396 B1 | 3/2002 | Klots et al. |
| 6,430,170 B1 | 8/2002 | Saints et al. |
| 6,614,758 B2 | 9/2003 | Wong et al. |
| 6,735,670 B1 | 5/2004 | Bronstein et al. |
| 6,757,742 B1 | 6/2004 | Viswanath |
| 6,973,082 B2 | 12/2005 | Devi et al. |
| 7,190,696 B1 | 3/2007 | Manur et al. |
| 7,224,845 B1 | 5/2007 | Russo et al. |
| 7,280,527 B2 | 10/2007 | Basso et al. |
| 7,346,706 B2 | 3/2008 | Rezaaifar et al. |
| 7,424,016 B2 | 9/2008 | Sweeney et al. |
| 7,539,750 B1 | 5/2009 | Parker et al. |
| 7,554,914 B1 | 6/2009 | Li et al. |
| 7,567,567 B2 | 7/2009 | Muller et al. |
| 7,580,417 B2 | 8/2009 | Ervin et al. |
| 7,613,209 B1 | 11/2009 | Nguyen et al. |
| 7,623,455 B2 | 11/2009 | Hilla et al. |
| 7,639,614 B2 | 12/2009 | Nakagawa et al. |
| 7,796,594 B2 | 9/2010 | Melman et al. |
| 7,821,925 B2 | 10/2010 | Davies |
| 7,821,931 B2 | 10/2010 | Swenson et al. |
| 7,898,959 B1 | 3/2011 | Arad |
| 7,969,880 B2 | 6/2011 | Yano et al. |
| 7,979,671 B2 | 7/2011 | Aviles |
| 8,004,990 B1 | 8/2011 | Callon |
| 8,175,107 B1 | 5/2012 | Yalagandula et al. |
| 8,238,250 B2 | 8/2012 | Fung |
| 8,243,594 B1 | 8/2012 | Fotedar et al. |
| 8,244,909 B1 | 8/2012 | Hanson et al. |
| 8,259,585 B1 | 9/2012 | S P et al. |
| 8,274,971 B2 | 9/2012 | Battle et al. |
| 8,339,951 B2 | 12/2012 | Scaglione |
| 8,355,328 B2 | 1/2013 | Matthews et al. |
| 8,364,711 B2 | 1/2013 | Wilkins et al. |
| 8,503,456 B2 | 8/2013 | Matthews et al. |
| 8,587,674 B2 | 11/2013 | Iwata |
| 8,614,950 B2 | 12/2013 | Roitshtein et al. |
| 8,625,594 B2 | 1/2014 | Safrai et al. |
| 8,660,005 B2 | 2/2014 | Roitshtein et al. |
| 8,756,424 B2 | 6/2014 | Roitshtein et al. |
| 8,792,497 B2 | 7/2014 | Rajagopalan et al. |
| 8,848,728 B1 | 9/2014 | Revah et al. |
| 9,171,030 B1 | 10/2015 | Arad et al. |
| 9,237,100 B1 | 1/2016 | Mizrahi et al. |
| 9,269,439 B1 | 2/2016 | Levy et al. |
| 2002/0093952 A1 | 7/2002 | Gonda |
| 2002/0133594 A1* | 9/2002 | Syvanne .............. H04L 63/0227 709/226 |
| 2003/0043825 A1 | 3/2003 | Magnussen et al. |
| 2003/0147385 A1 | 8/2003 | Montalvo et al. |
| 2003/0210688 A1 | 11/2003 | Basso et al. |
| 2003/0235168 A1 | 12/2003 | Sharma et al. |
| 2004/0073640 A1 | 4/2004 | Martin et al. |
| 2005/0198297 A1 | 9/2005 | Tzeng |
| 2005/0213582 A1 | 9/2005 | Wakumoto et al. |
| 2006/0251109 A1 | 11/2006 | Muller et al. |
| 2007/0098006 A1* | 5/2007 | Parry .................. H04L 12/4633 370/437 |
| 2007/0280258 A1 | 12/2007 | Rajagopalan et al. |
| 2008/0031263 A1 | 2/2008 | Ervin et al. |
| 2008/0037544 A1* | 2/2008 | Yano .................. H04L 45/00 370/392 |
| 2008/0049774 A1 | 2/2008 | Swenson et al. |
| 2008/0052488 A1 | 2/2008 | Fritz et al. |
| 2008/0069114 A1 | 3/2008 | Shimada |
| 2008/0084881 A1 | 4/2008 | Dharwadkar et al. |
| 2008/0181103 A1 | 7/2008 | Davies |
| 2008/0205655 A1 | 8/2008 | Wilkins et al. |
| 2009/0196303 A1 | 8/2009 | Battle et al. |
| 2009/0274154 A1 | 11/2009 | Kopelman et al. |
| 2010/0023726 A1 | 1/2010 | Aviles |
| 2010/0142410 A1 | 6/2010 | Huynh Van et al. |
| 2010/0214913 A1 | 8/2010 | Kompella |
| 2010/0215042 A1* | 8/2010 | Sato .................. H04L 12/413 370/392 |
| 2010/0284404 A1 | 11/2010 | Gopinath et al. |
| 2011/0013627 A1 | 1/2011 | Matthews et al. |
| 2011/0013638 A1 | 1/2011 | Matthews et al. |
| 2011/0013639 A1 | 1/2011 | Matthews et al. |
| 2011/0102612 A1 | 5/2011 | Iwata |
| 2011/0134925 A1 | 6/2011 | Safrai et al. |
| 2011/0295894 A1 | 12/2011 | Yoo |
| 2011/0296411 A1 | 12/2011 | Tang et al. |
| 2012/0136846 A1 | 5/2012 | Song et al. |
| 2013/0013880 A1 | 1/2013 | Tashiro et al. |
| 2014/0093073 A1 | 4/2014 | Horgan et al. |
| 2014/0115167 A1 | 4/2014 | Roitshtein et al. |
| 2014/0160934 A1 | 6/2014 | Roitshtein et al. |
| 2014/0173129 A1 | 6/2014 | Basso et al. |
| 2014/0301394 A1 | 10/2014 | Arad et al. |
| 2014/0325228 A1 | 10/2014 | Roitshtein et al. |
| 2015/0334057 A1 | 11/2015 | Gao et al. |

OTHER PUBLICATIONS

IEEE Std 802.1Q—2011 (Revision of IEEE Std.802.1Q—2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).

IEEE P802.1aq/D4.6, Draft Amendment to IEEE Std 802.1Q—2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

Demetriades et al., "An Efficient Hardware-based Multi-hash Scheme for High Speed IP Lookup," 2008 16th IEEE Symposium on High Performance Interconnects, Aug. 2008.

Herlihy et al., "Hopscotch Hashing," *DISC '08 Proceedings of the 22nd International Symposium on Distributed Computing*, pp. 350-364 (Sep. 22, 2008).

"Hopscotch Hashing," Wikipedia entry downloaded from http://en.wikipedia.org/wiki/Hopscotch_hashing on Oct. 6, 2014 (3 pages).

Peng et al., "Content-Addressable memory (CAM) and its network applications," International IC—Taipei Conference Proceedings, May 2000.

Raoof, Impact of Depolarization Effects on MIMO Polarized Wireless Configuration, Wireless Communications, Networking and Mobile Computing, 2007. WiCom 2007, pp. 1-4 (Sep. 2007).

Shavit, "Hopscotch Hashing," PowerPoint Presentation downloaded from http://www.velox-project.eu/sites/default/files/Hopscotchc%20Hashing%20talk%20slides.ppt on Oct. 6, 2014 (50 slides).

Thaler et al., "Multipath Issues in Unicast and Multicast Next-Hop Selection," The Internet Society, pp. 1-10 (2000).

U.S. Appl. No. 13/115,670, "Methods and Apparatus for Handling Multicast Packets in an Audio Video Bridging (AVB) Network," filed May 25, 2011 (Pannell, et al.).

U.S. Appl. No. 61/695,520, "Efficient TCAM Architecture," filed Aug. 31, 2012 (Levy et al.).

* cited by examiner

HASH COMPUTATION FOR NETWORK SWITCHES

CROSS REFERENCE TO RELATED APPLICATION

The present application is a divisional of U.S. patent application Ser. No. 12/537,078, now U.S. Pat. No. 9,237,100, entitled "Hash Computation for Network Switches", filed on Aug. 6, 2009, which claims the benefit of U.S. Provisional Patent Application No. 61/086,641, entitled "Hash Computation" filed Aug. 6, 2008. The disclosures of the applications referenced above are hereby expressly incorporated by reference in their entireties.

FIELD OF TECHNOLOGY

The present disclosure relates generally to communication systems and, more particularly, to computing hash values for data units at a computing device.

BACKGROUND

Today, hashing functions are widely used in a variety of computing applications to map data in a larger set to a value in a smaller set. For example, a relatively long sequence of bits may be supplied as an input into a mathematical function to generate a shorter sequence of bits that serves as an index into a database table. In general, mathematicians and engineers prefer hashing methodologies that have low computational complexity, are deterministic, yield hash values uniformly distributed across the smaller set, and have other properties useful in computing.

One area of application in which hashing can be particularly useful is load balancing in network switching. In general, a network switch may receive and transmit data packets via multiple ingress and egress links. In many situations, it is permissible to direct a received data packet via more than one egress link to properly route the data packet to its destination. Moreover, network switches sometimes are purposefully aggregated into load-balancing networks to provide more bandwidth between communicating devices or networks. Grouping links together to define wider communication channels is known as link aggregation (LAG). In those situations where multiple links present equally attractive routing choices to a network switch, the routing technique is typically referred to as equal-cost multi-path (ECMP) routing. If, on the other hand, some of the links present non-equal routing choices to the network switch, the routing technique may be referred to as weighed-cost multi-path (WCMP).

To properly balance the distribution of data packets among the multiple equally appropriate links in LAG applications, the network switch may "hash" the data packets into the corresponding links. However, known hashing techniques often produce polarization, or "favoring" of a particular link in a group of suitable links for certain types of packets. Further, when multiple network switches operate as respective hops in a load-balancing network, the same load balancing decision may be made at each hop, thus further polarizing a particular path through the load-balancing network.

SUMMARY OF THE DISCLOSURE

In an embodiment, a method for load balancing in a communication network having a plurality link aggregate groups includes receiving a data unit at a first one of the plurality of network devices associated with a first one of the plurality of link aggregate groups, applying a hashing function to the data unit to generate a first hash value, wherein the first hash value identifies a communication link in the first one of the plurality of link aggregate groups, receiving the data unit at a second one of the plurality of network devices associated with a second one of the plurality of link aggregate groups; and applying the hashing function to the data unit to generate a second hash value that is distinct from the first value, such that the second hash value identifies a communication link in the second one of the plurality of link aggregate groups along which the data unit is to be communicated.

In another embodiment, a network device operating in a load balancing network includes a first network interface to receive a data unit, a hash value generator to generate a hash value based on the data unit, a link selector to select a communication link in a link aggregate group based on the hash value, and a second interface coupled to the link aggregate group to transmit the data unit along the communication link. The hash value generator includes a hash input selector to select a first set of inputs to be included in hash input data according to a fixed scheme, and to select a second set of inputs according to a user-configurable scheme, where the hash input data includes at least a portion of the data unit, and a hashing function to generate the hash value based on the hash input data.

In another embodiment, a method in a load balancing network device for avoiding polarization including receiving a data unit, generating a hash input data based at least in part on a data unit using a fixed scheme and a user-configurable scheme, applying a hashing function to the hash input data to generate a hash value, selecting a communication link in a link aggregate group based on the hash value, and transmitting the data unit along the communication link.

In another embodiment, a load balancing communication network includes a plurality of link aggregate groups, a first network device that includes a first hash value generator that implements a hashing function to generate a first hash value based on a data unit, such that the first hash value identifies a communication link in a first one of the plurality of link aggregate groups along which the data unit is to communicated, and a second network device that includes a second hash value generator that implements the hashing function to generate a second hash value based on a data unit, such that the first hash value identifies a communication link in a second one of the plurality of link aggregate groups along which the data unit is to communicated In an embodiment, a method in a network device for generating a hash value corresponding to a data unit includes generating hash input data, selecting a mask indicative of which portions of the hash input data are to be used in hash computation, applying the mask to the hash input data, and applying a hashing function to the hash input data to generate the hash value. Generating the hash input data includes retrieving user-defined data from a user-modifiable memory and using the user-defined data to select a first set of portions of the data unit to be included in the hash input data.

In various implementations, one or more of the following features may be included. Generating the input data includes retrieving fixed data from a memory that is not user modifiable, and using the fixed data to select a second set of portions of the data unit to be included in the hash input data. Using the fixed data to select a second set of portions of the data unit includes applying a fixed offset into a header of the data unit. When the data unit is associated with a plurality of communication protocol layers, using the user-defined data to select a first set of portions of the data unit includes using a first field of the user-defined data to determine a header corresponding to a desired communication protocol layer of the data unit, and using a second field of the user-defined data to locate a portion in the header of the desired communication protocol layer of the data unit. Selecting the mask is based on an ingress port of the network device at which the data unit has been received. The data unit is a data packet associated with one of a plurality of packet types, so that selecting the mask is based on the one of the plurality of packet types. Each of the plurality of packet types is associated with a respective data-carrying mechanism. Applying the hashing function includes using a seed specific to the network device. Selecting the hashing function according to a user input.

In another embodiment, an apparatus for generating a hash value corresponding to a data unit includes a user-modifiable memory; a hash input selector to generate hash input data including at least portions of the data unit, such that the hash input selector includes a first selector to select a first plurality of portions of the data unit according to user-defined data stored in the user-modifiable memory; a hash mask selector to obtain a hash mask; a hash input generator to apply the hash mask to the hash input data; and a hash generator to generate the hash value based on the hash input data.

In various implementations, one or more of the following features may be included. The apparatus further includes a memory that is not user-modifiable, and the hash input selector further includes a second selector to select a second plurality of portions of the data unit according to fixed data stored in the memory that is not user-modifiable. The hash input selector further includes a third selector to select an identifier of the ingress port at which the data unit was received for inclusion in the hash input data. The apparatus is included in a network device communicating with at least one other network device via a communication link and including a register to store a seed specific to the network device, and the hash generator including an input to receive the seed. A first stage to generate an intermediate hash value having a first length based on the hash input data; and a second stage to generate the hash value having a second length based on the intermediate hash value; where the first length is different than the second length. A first hashing function associated with a first hashing mode to generate a first hash value based on the hash input data, a second hashing function associated with a second hashing mode to generate a second hash value based on the hash input data, an input to receive a hash mode selection signal, and a selector to select between the first hashing function and the second hashing function based on the hash mode selection signal. A first mask source to obtain a first potential hash mask from a respective register based on an ingress port at which the data unit has been received, a second mask source to obtain a second potential hash mask from a memory based on a rule associated with the data unit, a third mask source to generate a third potential hash mask based on a packet type with which the data unit is associated, and a mask source selector to select between the first mask source, the second mask source, and the third mask source.

In yet another embodiment, a load balancing network comprises: a first network device coupled to a second network device. The first network device includes: a first network interface configured to receive a data unit; a second network interface configured to transmit the data unit, wherein the second network interface is coupled to a first plurality of communication links corresponding to a first link aggregate group; a first hash value generator configured to apply a hash function to the data unit to generate a first hash value; and a first link selector to select, based on the first hash value, a first communication link in the first link aggregate group along which the data unit is to be communicated. The second network device includes: a third network interface coupled to the first communication link and configured to receive the data unit; a fourth network interface configured to transmit the data unit, wherein the second network interface is coupled to a second plurality of communication links corresponding to a second link aggregate group; a second hash value generator configured to apply the hash function to the data unit to generate a second hash value distinct from the first hash value; and a second link selector to select, based on the second hash value, a second communication link in the second link aggregate group along which the data unit is to be communicated.

DETAILED DESCRIPTION

Figure 1:
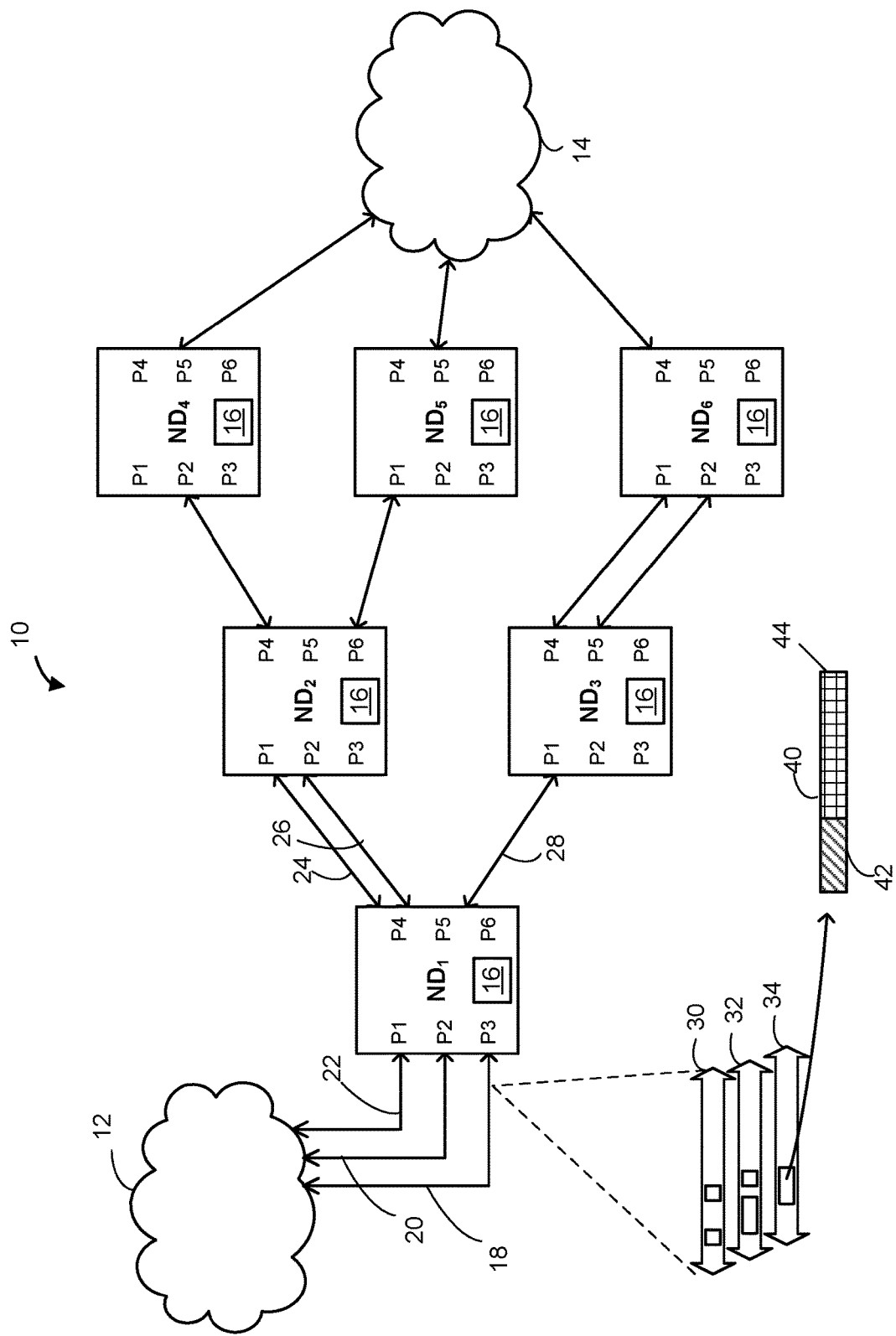
FIG. 1 is a block diagram of a communication network in which network devices may apply hash computation techniques discussed herein.

FIG. 1 is a block diagram illustrating an example multi-path load-balancing network 10 in which several network devices $ND_1, ND_2, \ldots ND_6$ process data flows between an external network 12 and an internal network 14, for example. The network devices $ND_1$-$ND_6$ may be of the same or different types, and may include workgroup switches, other types of switches, routers, or any other devices having data processing capability. Each of the network devices $ND_1$-$ND_6$ includes a hash value generator 16 that implements at least some of the hashing techniques discussed below.

In operation, the network device $ND_1$ receives data units (such as packets or frames) traveling from the external network 12 to the internal communication network 14 via communication links 18, 20, and 22 at respective ports P1, P2, and P3, and forwards the received data units to the network devices $ND_2$ or $ND_3$ via the corresponding ports P4, P5, and P6 and, ultimately, respective communication links 24, 26, and 28. The network device $ND_1$ thus has a receive interface to which the communication links 18, 20, and 22 are coupled, and a transmit interface coupled to the communication links 24, 26, and 28. The routing configuration of the load-balancing network 10 may be such that the network device $ND_1$ may select more than one of the ports of P4, P5, or P6 to properly direct a data packet toward its destination in the internal network 14. However, because each of the communication links 24-28 has limited bandwidth, the network device $ND_1$ applies load-balancing techniques to distribute the received packets among the appropriate ones of the links 24-28. To this end, the network device $ND_1$ utilizes the hash value generator 16 to generate an efficient hash value using some or all of fixed portions of data packets, user-configured portions of data packets, parameters specific to the network device $ND_1$, etc. Moreover, the hash value generator may support selective, user-configurable masking of portions of data packets and parameters to allow operators to efficiently configure the load-balancing network 10. At least some embodiments of the hash value generator 16 advantageously avoid link polarization and improve the overall distribution of data packets among communication links.

More specifically, the hash generator 16 generates a hash value using a fixed scheme and a user-configurable scheme to select portions of a data unit (e.g., a data packets, a frame, etc.), as well as network-device-specific fields or other data not included in the data unit. The hash value is then applied to a link selector such as a modulo divider to select a communication link in a link aggregate group along which the data packet is to travel. Even though the network devices $ND_1$-$ND_6$ may have the same hash generator 16 applying the same one or several hashing functions, the devices ND1-$ND_6$ generate different hash values in response to the same data unit, thus avoiding polarization at the corresponding link aggregate groups. Further, the network devices $ND_1$-$ND_6$ may provide further flexibility in link selection by applying hashing masks which may be selected based on the ingress port at which the data packet arrives, the type of the data packet, or a rule in a memory, for example. Still further, the network devices $ND_1$-$ND_6$ may apply different seeds to the respective hashing functions.

It will be noted that although FIG. 1 illustrates a particular embodiment of the network devices $ND_1$-$ND_6$, each of these devices may generally include any number of ingress and egress ports, and may use the hash value generator 16 to hash data packets traveling both in the inbound and the outbound directions relative to the internal network 14. In some configurations, some or all of the network devices $ND_1$-$ND_6$ may also perform protocol translation for some of the packets by removing and/or adding protocol headers at one or several layers of the corresponding communication protocol stack.

The links 18-22 may correspond to different physical communication channels such as network cables, wireless bands, etc., or logical channels such as timeslots of a digital signal 1 (DS1) line, to take one example. Similarly, ports P1-P3 may correspond to physical or logical resources of the network device $ND_1$. As illustrated in FIG. 1, the link 18 may carry one or more data flows 30-34. Typically but not necessarily, each of the data flows 30-34 is a bidirectional flow including data traveling from the network 12 to the network 14, or inbound data, and data traveling to the network 12 from the network 14, or outbound data. The links 20 and 22 may also carry one or several data flows, and some of the data flows 30-34 may be associated with more than one of the links 18-22.

In general, the data flows 30-34 may be associated with different communication protocols such as Transmission Control Protocol (TCP) layered over Internet Protocol (IP) (hereinafter, "TCP/IP"), User Datagram Protocol (UDP) layered over IP (hereinafter, "UDP/IP"), File Transfer Protocol (FTP), Hypertext Transfer Protocol (HTTP), etc. For example, the data flow 30 may correspond to FTP, the data flow 32 may correspond to Telnet, and the data flow 34 may correspond to HTTP. Further, some of the data flows 30-34 may correspond to different sessions associated with the same communication protocol. A typical network link may also include Simple Mail Transfer Protocol (SMTP), Structured Query Language (SQL), and several additional data flows associated with mailing, browsing, database, remote login, and other application types. Although the illustrative data flows 30-34 are associated with protocols layered over IP, an operator may configure the network devices $ND_1$-$ND_6$ to process and route data flows on other layers of various protocol stacks.

Each of the data flows 30-34 may include multiple streams, sessions, or connections. It is noted that some protocols, such as TCP, are connection-oriented while others, such as UDP, are connectionless. For example, an outside host on the network 12 may connect to a local host on the network 14 by establishing a TCP connection having a particular address and port combination on both ends. This connection is identifiable by the TCP header specifying, in part, the address of the outside host, the address of the local host, the port on the outside host, and the port on the local host. An individual TCP/IP packet may carry a certain quantum or chunk of information associated with the same connection, or communication session. On the other hand, a pair of hosts may use the UDP protocol to exchange individual messages, or datagrams, without establishing a connection. Thus, each of the data flows 30-34 may include one or more streams such as TCP including multiple packets associated with a single data exchange or single packets conveying individual messages in their entirety. In the examples discussed below, a data stream generally refers to a unidirectional or bidirectional data exchange between two or more hosts including one or more data units such as data packets or frames.

With continued reference to FIG. 1, an example data packet 40 may belong to the TCP/IP flow 34 and may travel in the inbound direction relative to the internal network 14. The data packet 40 may include a header 42 and a payload 44. In general, the header 42 may correspond to one or more layers of the protocol stack and may, in some cases, identify the corresponding packet as belonging to a particular connection-oriented or connectionless data stream. In the examples below, the header 42 refers to all information that precedes the payload on the transport layer, i.e., layer four (L4) in the Open System Interconnection (OSI) seven-layer model. However, if desired, the header 42 may be understood to include all headers up to and including the application-layer header or, conversely, include less than the headers of the layer two (L2), layer 3 (L3), and L4 of the OSI model.

In general, data packets traveling through the load-balancing network 10 may be of any desired length consistent with the corresponding protocol (e.g., TCP/IP in the case of the data packet 40). Further, the length of the data packet 40 may be operator-configurable to accommodate the particular requirements of the network devices $ND_1$-$ND_6$. In some embodiments, the network devices $ND_1$-$ND_6$ may operate on protocols or protocol layers which do not define packets of a particular length. In this sense, an individual packet may be any logical designation of a grouping or quantum of data. In some embodiments, the term "packet" may refer simply to a grouping of data on a particular stream for the purpose of generating a hash value by one of the network devices $ND_1$-$ND_6$. On the other hand, in other embodiments, this term may refer to a grouping of data included in two or more frames of a communication protocol. For example, a single data packet may include multiple TCP frames.

Figure 2:
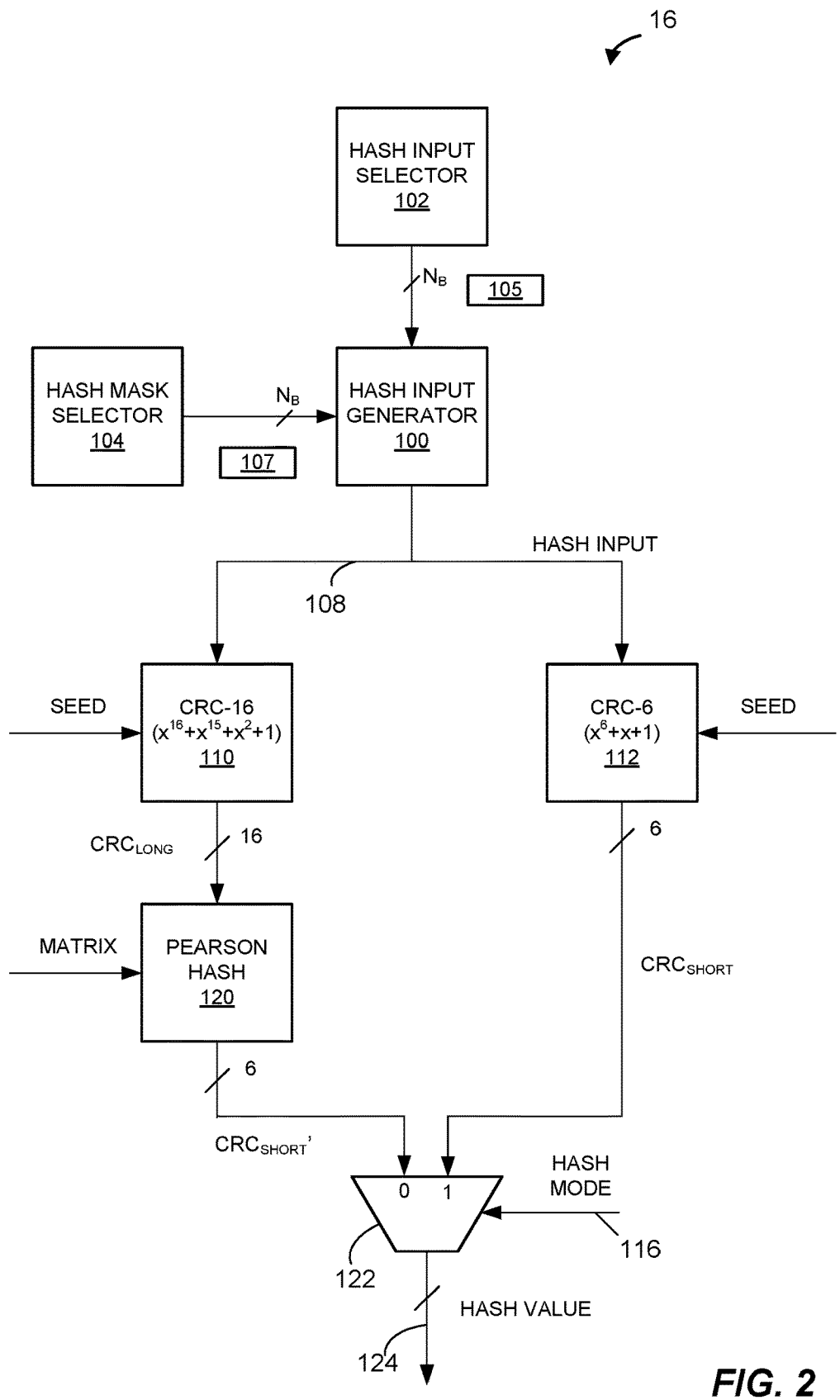
FIG. 2 is a block diagram of an example hash value generator which may be implemented in the network devices of FIG. 1.
Figure 3:
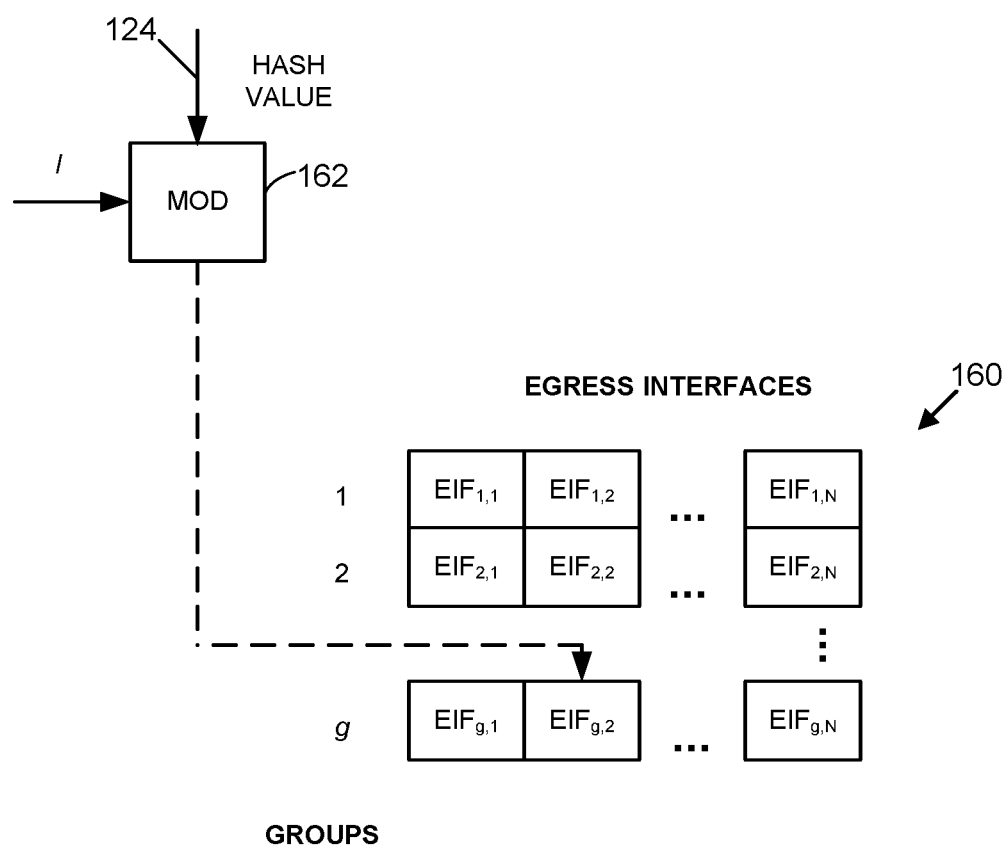
FIG. 3 is a block diagram that illustrates an example application of a hash value generated by the hash value generator of FIG. 2.
Figure 6:
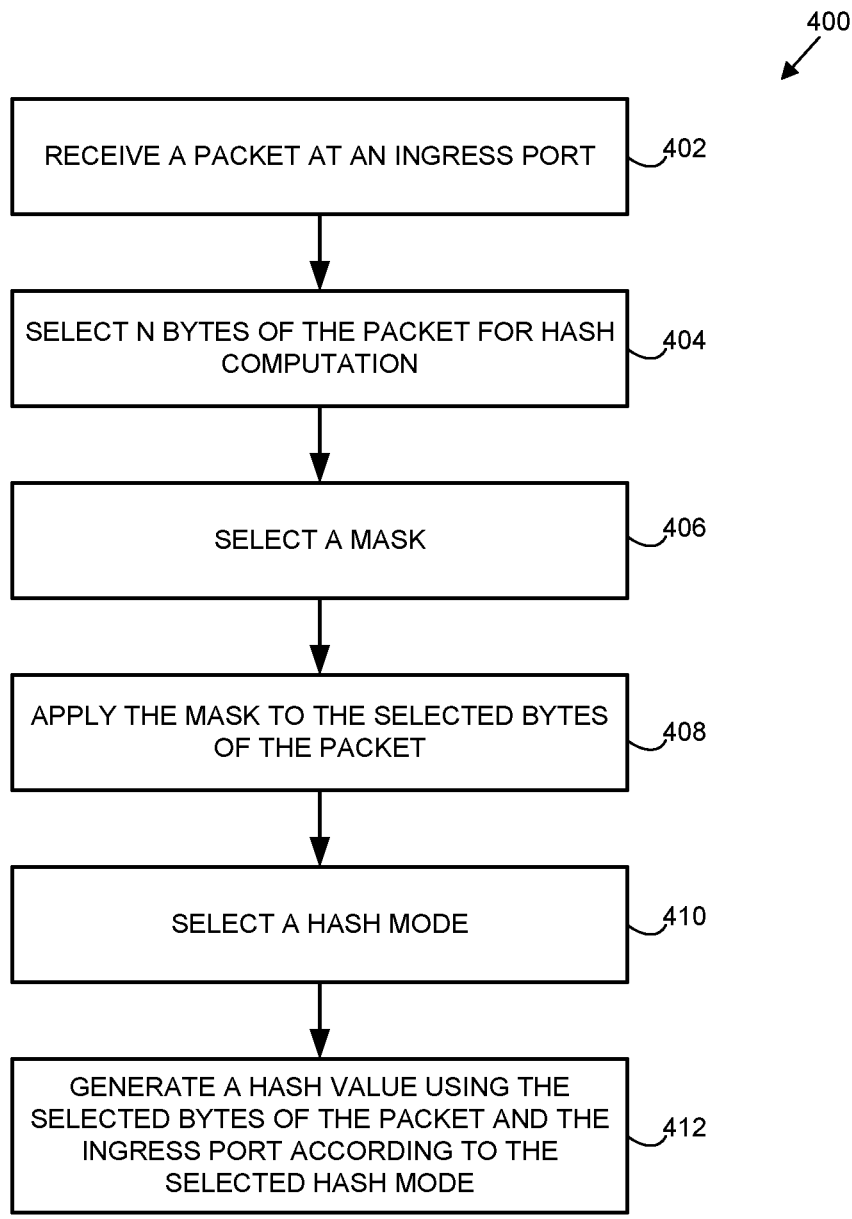
FIG. 6 is a flow diagram of an example method for generating a hash value that may be implemented by one or several network devices of FIG. 1.
Figure 7:
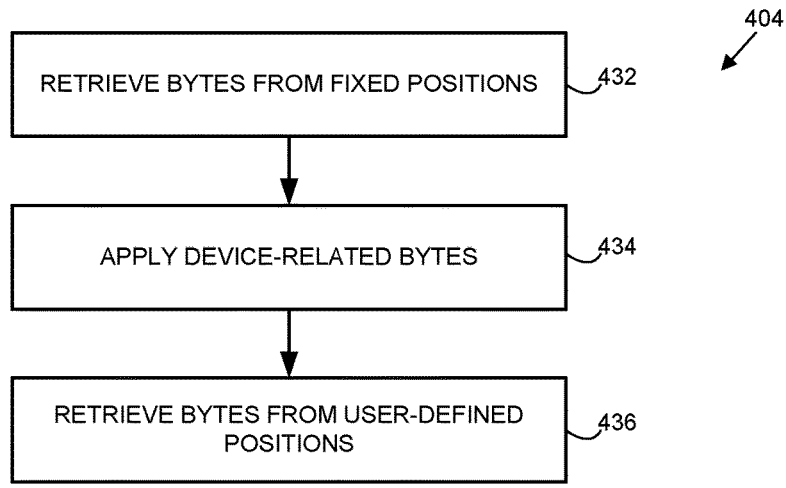
FIG. 7 is a flow diagram of an example method for generating an input to the hash value generator of FIG. 2.
Figure 8:
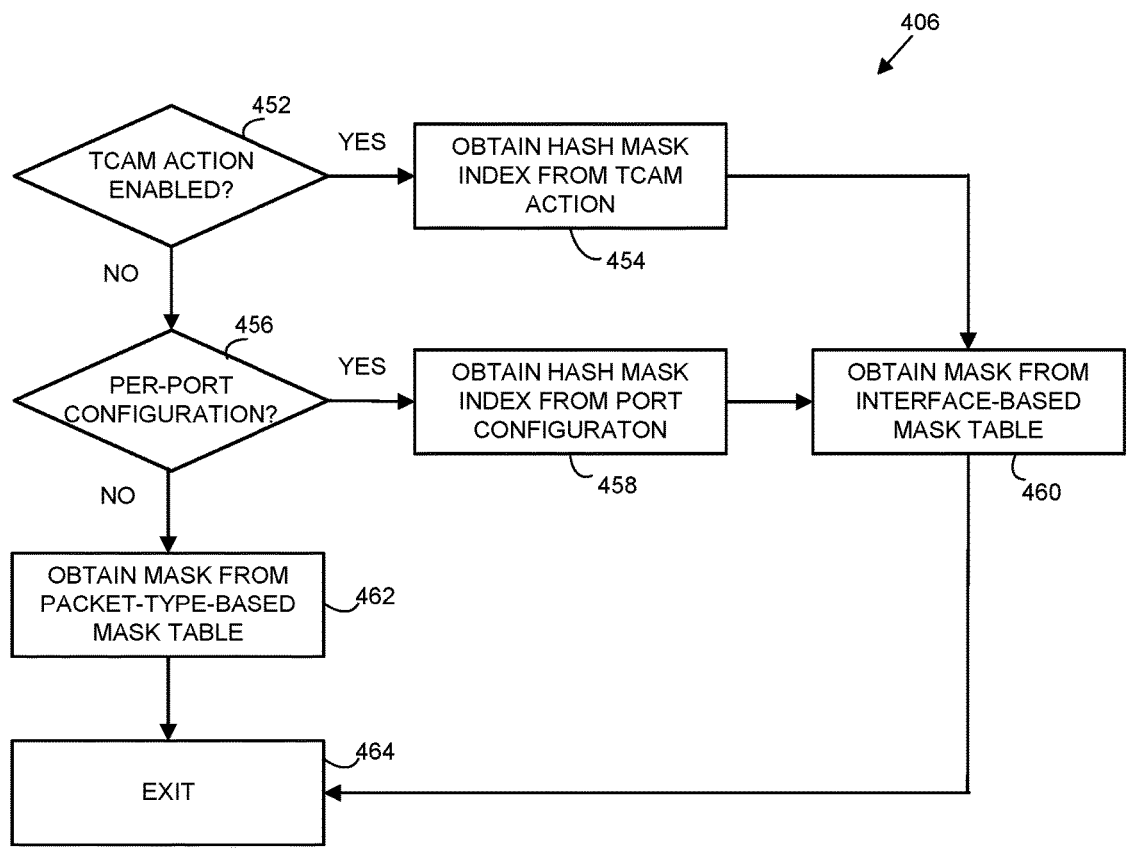
FIG. 8 is a flow diagram of an example method for selecting a hash mask which may be implemented by the hash mask selector of FIG. 5.

Next, FIG. 2 depicts a high-level architecture of the hash value generator 16, followed by a diagram in FIG. 3 that illustrates an example application of the output of the hash value generator 16 of FIG. 2 to the data packet 40 illustrated in FIG. 1. A detailed illustration of an example hash input selector and an example hash masked selector is described with reference to FIGS. 4 and 5, respectively. FIGS. 6-8 then illustrate several flow diagrams of example methods that may be implemented by the network devices $ND_1$-$ND_6$ to generate efficient hash values.

Referring to FIG. 2, the hash value generator 16 includes a hash input generator 100 coupled to a hash input selector 102 and a hash mask selector 104. During operation, the hash input selector 102 supplies $N_B$ input bytes (or "input data") 105, and the hash mask selector 104 supplies an $N_B$-long bit hash mask 107 to the hash input generator 100. In one embodiment, $N_B$ is equal to 70. In other embodiments, however, other suitable values of $N_B$ may be utilized. In response to the inputs from the components 102 and 104, the hash input generator 100 masks the input bytes 105 unselected by the hash mask 107, i.e., zeroes-out the unselected bytes or replaces these bytes with a predefined value to generate a hashing function input. For example, the input bytes 105 from the hash input selector 102 may include, in the first several positions, the bytes 0xA3 0xD4 0x36 0xF3 0x55 . . . (where "0x" denotes hexadecimal representation), the hash mask 107 may begin with the bits 11001 . . . , and the hash input generator 100 may accordingly output 0xA3 0xD4 0x00 0x00 0x55 . . . at an output line 108. In this manner, the hash mask 107 may selectively turn on or off individual bytes in the $N_B$ input bytes 105, and thus control which fields (e.g., fields in the header 42, fields associated with certain parameters of the device $ND_1$, etc.) are used in generating a hash value.

As illustrated in FIG. 2, the hash input generator 100 supplies the hashing function input to one or both of the cyclic redundancy check (CRC) generators 110 and 112 via line 108. Although used primarily in error detection, CRC algorithms operate as hashing functions that generate a hash value of a certain length based on a longer input string. In this example, the CRC generator 110 outputs a 16-bit hash value $CRC_{LONG}$, and the CRC generator 112 outputs a 6-bit hash value $CRC_{SHORT}$. Each of the CRC generators 110 and 112 may implement a different algorithm associated with a respective polynomial. Importantly, each of the CRC generators 110 and 112 receives a seed via a respective seed input as one of the parameters, which may be specific to the device implementing the hash value generator 16. Referring again to FIG. 1, each of the network devices $ND_1$-$ND_6$ may apply a different seed to one or both of the CRC generators 110 and 112 to generate distinct hash values when processing the same data packet.

To generate a hash output of the same length irrespective of which of the two CRC algorithms has been selected via a hash mode selection signal 116, in accordance with an embodiment, the hash value generator 16 may include a Pearson hash matrix 120 to map the 16-bit output of the CRC generator 110 to a 6-bit value. The Pearson hash matrix 120 in this example has 64 rows, each storing a 6-bit value. The notation TABLE[n] accordingly refers to the 6-bit value stored in the row n of the Pearson has matrix 120. As one example, the Pearson hash matrix 120 may generate a first parameter A using bits 5 through 0 of $CRC_{LONG}$ as an index into a look-up table:

$$A = TABLE[CRC_{LONG}[5:0]], \quad (1)$$

and the second parameter B according to $$B = TABLE[A \text{ XOR } CRC_{LONG}[11:6]], \quad (2)$$

so that $$CRC_{SHORT}' = TABLE[B \text{ XOR } \{00, CRC[15:12]\}]. \quad (3)$$

Each of the network devices $ND_1$-$ND_6$ may implement a distinct TABLE matrix, or other suitable distribution mechanism, to further reduce the probability that two network devices in the load-balancing network 10 generate the same hash value based on the same data packet.

A selector 122 selects one of $CRC_{SHORT}$ and $CRC_{SHORT}'$ based on a hash mode selection signal 116, and outputs the selected bits as the hash value via a line 124. In some embodiments, the hash mode selection signal 116 may correspond to a value in one of the user-configurable registers of the network device $ND_1$-$ND_6$ in which the hash value generator 16 resides. If desired, the hash input generator 100 may also include a selector component to selectively activate only one of the CRC generators 110 and 112 in response to the hash mode selection signal 116.

Of course, hash generators or hashing functions of any other type may be used instead of the CRC generators 110 and 112, or the Pearson hash matrix 120. Further, the length of the outputs of the CRC generators 110 and 112 also may be selected according to the desired implementation, and it will be noted that the specific polynomials, bit positions, etc. were discussed above by way of example only. Further, other polynomials of the same degree as the respective one of the CRC generator 110 and 112 may be used.

As schematically illustrated in FIG. 3, the hash value generated by the hash value generator 16 may be used as an index into an egress interface table 160. Referring again to FIG. 1, the network device $ND_1$ may determine, based on the header 42, the ingress port at which the data packet 40 is received, or using any other principle, that the data packet 40 belongs to a link aggregate group g having/members (i.e., links). Referring again to FIG. 3, a link selector 162 of the network device $ND_1$, may apply, for example, a modulo division function to the hash value to generate an index into the table 160:

$$Index = Hash \text{ Value mod } l. \quad (4)$$

The network device $ND_1$ may then use the generated index to select an entry in the egress interface table 160 at row g which specifies a link on which the data packet 40 is to be propagated.

Figure 4:
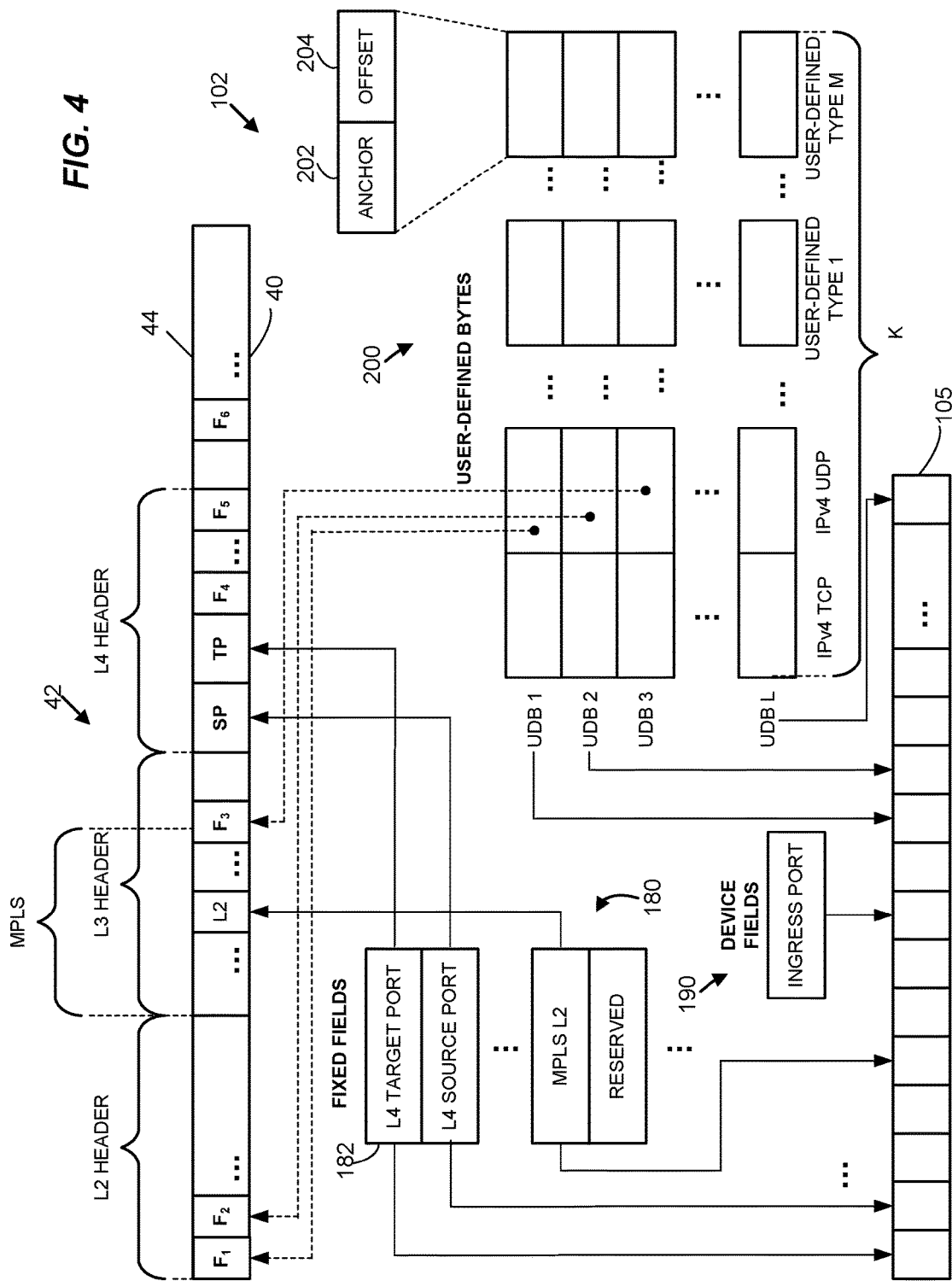
FIG. 4 is a block diagram of an example hash input selector which may be implemented in the network devices of FIG. 1.

Next, FIG. 4 is a block diagram of an example architecture of the hash input selector 102 in one embodiment of the hash value generator 16. Also, to continue with the example of processing the data packet 40 at the network device $ND_1$ (see FIG. 1), FIG. 4 schematically depicts how $N_B$ input bytes 105 are generated using some of the fields of the data packet 40 and, optionally, parameters of the network device $ND_1$.

A fixed field table 180 includes $N_{FX}$ entries, each specifying a field of the data packet 40 to be unconditionally applied to the input bytes 105 (although any field may be later masked out using the hash mask 107). Table 1 below lists fixed fields of an example data packet, along with the respective offsets (in bits) within the input bytes 105, in one embodiment of the fixed field table 180:

TABLE 1

| | |
|---|---|
| 15:0 | L4 Target Port |
| 31:16 | L4 Source Port |
| 51:32 | IP version 6 Flow |
| 55:52 | Reserved |
| 183:56 | IP DIP |
| 311:184 | IP SIP |
| 359:312 | MAC DA |
| 407:360 | MAC SA |
| 427:408 | MPLS L0 |
| 431:428 | Reserved |
| 451:432 | MPLS L1 |
| 455:452 | Reserved |
| 475:456 | MPLS L2 |
| 479:476 | Reserved |

In one embodiment, the packet field table 180 may be stored in a read-only memory, a FLASH memory, etc., or otherwise hard-coded into the hash input selector 102. In this embodiment, the packet field table 180 is not user-configurable and is stored in a memory that is not user-modifiable. In other embodiments, the packet field table 180 may be stored in a memory that is not a read-only memory or FLASH memory, and/or is user-configurable and/or is stored in a memory that is user-modifiable.

Referring to FIG. 4 and Table 1 above, in accordance with an embodiment, an entry 182 of the fixed field table 180 thus specifies, in an example, a field in the L4 header, target port, and the bits 0 through 15 in the input bytes 105 into which the target port field is to be copied. Because the boundaries of L3 and L4 headers may not always occur in the same positions, the entry 182 may identify the L4 target port field using a certain enumeration scheme, for example, and the hash input selector 102 may include additional logic to determine offsets of fixed fields within the data packet 40.

With continued reference to FIG. 4, a device fields list 190 may specify $N_{DS}$ device-specific parameters to be used as a portion of the hash input bytes 105. As illustrated in FIG. 4, an example entry in the list 190 may specify an offset in the hash input bytes 105 where the hash input generator 102 copies an identifier of the ingress port via which the network device $ND_1$ has received the data packet 40.

Further, the hash input generator 102 may support $N_{UD}$ user-defined bytes (UDBs) to allow network engineers and technicians to specify which additional fields of the data packet 40, if any, should be used to generate the hash input bytes 105. In the example embodiment illustrated in FIG. 4, each entry in a UDB table 200 specifies a field in the data packet 40 using a two-part format: an anchor sub-field 202 specifies one of the protocol stack layers L2, L3, etc., and an offset field 204 specifies an offset, in bits, of the desired field relative to the start of the header of the layer identified by the field 202. Of course, an individual entry of the UDB table 200 alternatively may conform to any other suitable format.

Specifically with respect to the anchor sub-field 202, a pre-defined enumeration scheme may be used to allow operators to select between L2 header, L3 header, L4 header, L4 payload, as well as the beginning of multi-protocol label switching (MPLS) sub-layers L1, L2, etc. In some embodiments, operators may configure the anchor sub-field 202 in some of the entries of the table 200 to point to non-standard, application- or network-specific protocols encapsulated within the application layer of the data packet 40.

In another aspect, the UDB table 200 may list $N_{UD}$ entries for each of the K packet types which may include, for example, TCP/IP, UDP/IP, etc. as well as M user-defined packet types. Columns of the UDB table 200 may be indexed by a signal specifying the packet type (not shown). The number of entries in the UDB table 200 in this embodiment is accordingly $N_{UD} \times K$. In one embodiment, the UDB table 200 is stored in a writable memory location to permit editing by user or software running on the network device $ND_1$, whereas the packet field table 180 is stored in a read-only memory. More generally, in one embodiment, the UDB table 200 may be user-configurable and may be stored in a user-modifiable memory, whereas the packet field table 180 is not user configurable and is stored in a memory that is not user-modifiable.

It is noted that the $N_B$ bytes of the hash input bytes 105 may include fixed packet fields, device-specific fields, and user-defined fields so that $$N_B = N_{FX} + N_{DS} + N_{UD}. \quad (5)$$

These $N_B$ bytes provide significant flexibility to operators in configuring hash computation and enable additional variation between hash values computed for the same data packet at different ones of the network devices $ND_1$-$ND_6$ by using device-specific parameters as a part of the hash input. In a sense, each of the tables or lists 180, 190, and 200 defines an independent selector of the input data, with the table 200 defining a fully configurable selector and the list 190 defining a partially configurable selector, in one embodiment.

Figure 5:
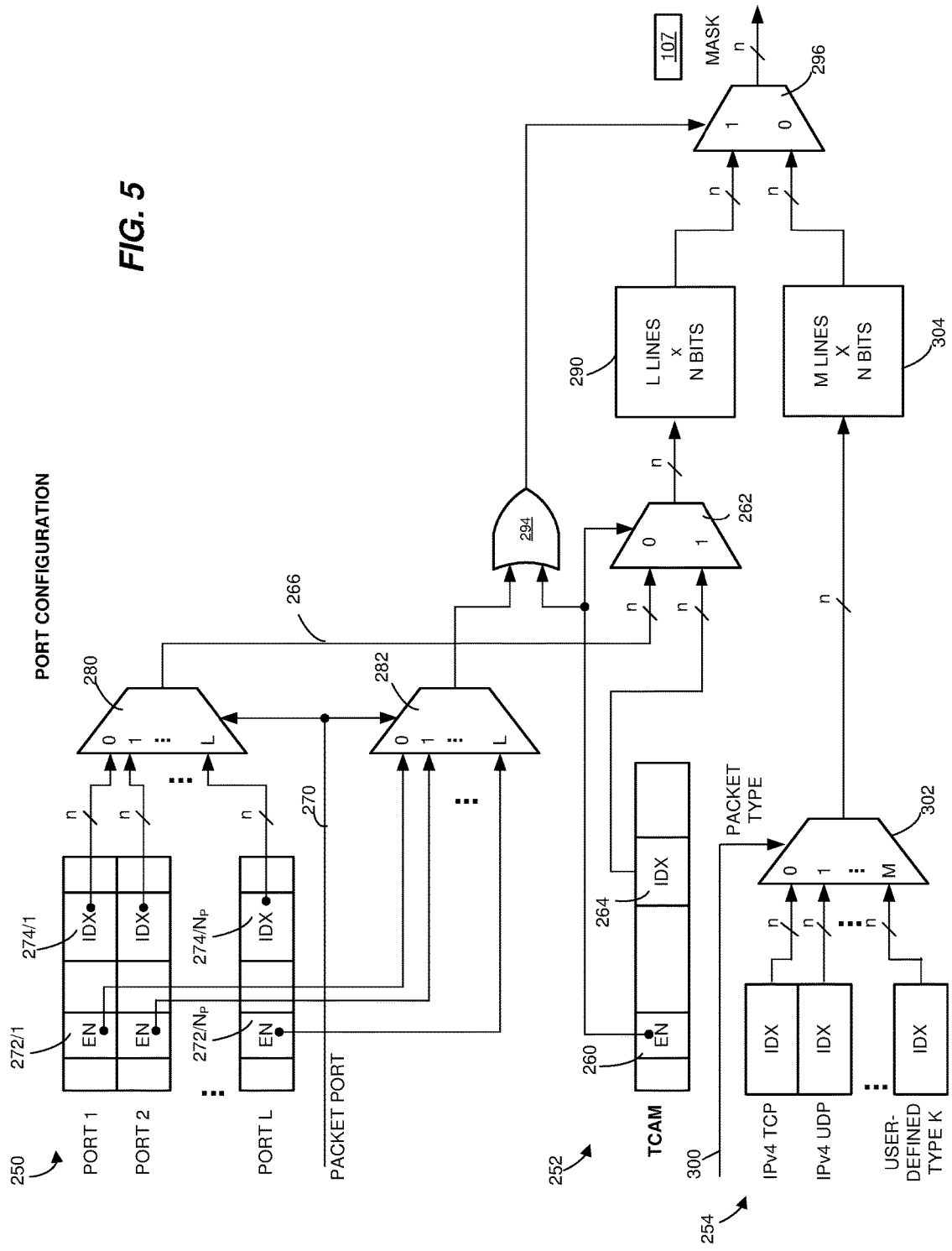
FIG. 5 is a block diagram of an example hash mask selector which may be implemented in the network devices of FIG. 1.

Now referring to FIG. 5, an example hash mask selector 104 includes several mask sources including a port mask table 250, a ternary content addressable memory (TCAM) mask table 252, and a packet-type mask table 254. Based on several user-configurable parameters discussed below, the hash mask selector 104 may generate the hash mask 107 (see FIG. 2) using port-specific configuration, TCAM rule-based configuration, or packet-type-specific configuration. In particular, a flag 260 may indicate whether TCAM lookup is enabled, and may be used as input into a multiplexer 262 to select between an index stored in a record 264 of the TCAM mask table 252 and an output 266 of the port mask table 250. In this example embodiment, the TCAM mask table 252 is "preferred" over the port mask table 250, although other configurations are also possible.

The hash mask selector 104 selects an appropriate entry of the port mask table 250 based on a packet port signal 270 which specifies the ingress port of the network device $ND_1$ at which the data packet 40 has been received. More specifically, the packet port signal 270 controls the selection, at multiplexers 280 and 282, between port-specific rows 1, 2, ... $N_P$, each of which stores a respective enable flag 272/1, 272/2, ... 272/$N_P$ and a respective index 274/1, 274/2, ... 274/$N_P$. Each of the rows 1, 2, ... $N_P$ may be a register storing port-specific parameters such as configuration options, for example. After an appropriate entry in the table 250 or 252 has been selected, the output of the multiplexer 262 is used as an index into an interface-based mask table 290. Each of the 4 rows of the interface-based mask table 290 may store an $N_B$-bit long hash input mask. In one contemplated embodiment, $L_{IF}$ is equal to 16 to accommodate a sufficiently high number of interface-specific mask selections. In other embodiments, $L_{IF}$ may be a suitable number other than 16. Of course, the mask table 250 generally may be stored in any kind of computer-readable memory. Further, as an alternative to TCAM, the mask table 252 may be disposed in CAM or in any other type of memory.

With continued reference to FIG. 5, each of the flags 260 and an appropriate one of the flags 272/1-272/$N_P$ may be set to zero (or otherwise to False). In this case, an OR gate 294 also outputs a signal equal to a logical zero which, when supplied to a multiplexer 296, causes the hash mask selector 104 to select the hash mask from the packet-type mask table 254. In particular, a packet type signal 300 is used to select at a multiplexer 302 an appropriate entry in the table 254 to be used as an index into a packet-type based table 304. The flags 260 and 272/1-272/$N_P$ thus define a selector for the hash input mask. In this example embodiment, the table 304 stores $L_{PT}$ lines, each defining a respective $N_B$-long hash input mask.

Generally with respect to FIGS. 3-5, some of the components of the hash value generator 16 may be implemented using hardware, software instructions executed by a processor, firmware instructions executed by a processor, or combinations thereof. In an embodiment, the hash value generator 16 is an application-specific integrated circuit (ASIC) implemented on an expansion card compatible with Peripheral Component Interconnect (PCI) or similar standard.

FIG. 6 illustrates an example flow diagram of a method 400 that may be implemented by the hash value generator 16 alone, or by the hash value generator 16 in co-operation with other components of the corresponding network device $ND_1$-$ND_6$ (see FIGS. 1-2). In block 402, a data unit such as the data packet 40 is received at a certain port $P_R$ of the network device implementing the method 400 (e.g., the network device $ND_1$). Next, in block 404, $N_B$ bytes are selected for hash computation from the data packet 40, parameters of the data packet 40 and/or the device $ND_1$ such as the port $P_R$, etc. Referring back to FIG. 4, the input selector 102 may perform some or all of the operations associated with block 404. An example method for implementing the block 404 is discussed below with reference to FIG. 7.

Once the $N_B$ bytes have been selected, a hash mask is selected in block 406 to choose which of the $N_B$ bytes obtained in block 404 are actually used in hash computation. One example apparatus that may perform mask selection is discussed above with reference to FIG. 5. One example method for implementing the block 406 is discussed below with reference to FIG. 8.

At block 408, the mask obtained at block 406 is applied to the $N_B$ hash input bytes selected at block 404. As illustrated in FIG. 2, for example, the hash input generator 100 may combine the inputs 105 and 107 to generate a hash input into one or several hashing functions. When the network device such as $ND_1$ supports more than one hashing function, the desired hashing mode may be selected at block 410. In some embodiments, hashing mode selection may be signaled via a certain agreed-upon register of the network device $ND_1$, via a predetermined memory location, or in any other suitable manner. In some embodiments, hashing mode selection may be easily configurable via operator commands.

Upon selecting the hashing mode at block 410, the method 400 may proceed to generate a hash value at block 412 by applying the appropriate hashing function to the hash input generated at block 408 or, as implemented in the example embodiment of FIG. 2, each available hashing function computes a hash value, and the output is selected according to the hashing mode selected at block 410. Also, as discussed in reference 2, hash computation at block 412 may involve multiple stages to generate a hash output of a desired length (e.g., using the Pearson matrix 120 at the second stage).

Referring now to FIG. 7, selecting N bytes for hash computation (block 404 of FIG. 6) may include retrieving several bytes from pre-defined or fixed fields of the data packet 40 (block 432). In general, because the load-balancing network 10 may support a large number of protocols, the offset of the fixed fields may vary according to the particular protocol to which a given data unit conforms. Thus, the field that stores L4 target port may begin at an offset X relative to the beginning of the data packet 40 (which conforms to TCP/IP in the examples above), or at a different offset Y relative to the beginning of an ICMP data packet, for example. Moreover, the position of a certain field in a data packet may also vary within the same protocol because of optional fields, variable-length fields, etc. As used herein, the term "fixed field" therefore refers to a field that the hash value generator 16 uses for hash computation irrespective of user configuration, although the field need not always be in the same position in the data packet.

In some embodiments, device-specific bytes are applied to the corresponding positions of the hash input bytes 105 (block 434). Generally speaking, the data applied to these positions may reflect a configuration parameter of the network device $ND_1$-$ND_7$ (such a device type, for example), a port at which the data packet has been received, or another parameter not directly related to the contents of the data packet. Finally, at block 436, user-defined bytes are applied (e.g., copied) to the hash input bytes 105 from the data packet. To continue with the example of TCP/IP data packet 40, one of user-defined bytes may refer to the Window Size parameter in the TCP header. To this end, the user-defined byte may identify the layer L4 using the anchor sub-field 202 (see FIG. 4) and further identify the offset of Window Size in the TCP header in the offset sub-field 204. It will be noted that user-defined bytes may be further selectable on a per-protocol basis, so that the hash input selector 102 uses the type of the data packet to identify which of the user-defined bytes to apply for a particular position in the hash input bytes 105.

Referring now to FIG. 8 and with continued reference to the example data packet 40, hash input mask selection at block 406 (FIG. 6) may include checking whether TCAM action is enabled at block 452 and, if it is, obtaining a hash mask index from TCAM at block 454. If it is determined at block 452 that TCAM action is not enabled, per-port configuration may be checked at block 456 using the port number $P_R$ that identifies the ingress port at which the data packet 40 has arrived. If the corresponding flag in the register for the port $P_R$ indicates that per-port configuration is enabled, a hash mask index is obtained from another position in the port register (block 458).

At block 460, one of the hash index obtained from a TCAM action or the hash index from a port register is used to access an interface-based mask table and retrieve a hash input mask. After block 460, the method 406 may end (block 464). If it is determined at block 456 that per-port configuration is not enabled, the hash input mask may be obtained based on the type of the data packet 40 at block 462. One example of an apparatus that implements the steps 452-458 is illustrated in FIG. 5

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed merely as providing illustrative examples and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for load balancing in a communication network having a plurality of link aggregate groups, the method comprising:
   receiving a data unit at a first network interface of a first network device of a plurality of network devices associated with a first one of the plurality of link aggregate groups;
   generating, by the first network device, a first hash input data based on the data unit;
   applying, at the first network device, a hashing function to the first hash input data to generate a first hash value, including applying a first seed that is specific to the first network device;
   applying to the first hash value, at the first network device, a Pearson hash with a first Pearson matrix to generate a second hash value, wherein the second hash value identifies a communication link in the first one of the plurality of link aggregate groups along which the data unit is to be communicated;
   transmitting, by the first network device, the data unit via the communication link in the first one of the plurality of link aggregate groups identified by the second hash value;
   receiving the data unit at a second network interface of a second network device of the plurality of network devices associated with a second one of the plurality of link aggregate groups;
   generating, by the second network device, a second hash input data based on the data unit;
   applying, at the second network device, the hashing function to the second hash input data to generate a third hash value that is distinct from the first hash value, including applying a second seed that is specific to the second network device and is different than the first seed;
   applying to the third hash value, at the second network device, the Pearson hash with a second Pearson matrix to generate a fourth hash value, wherein the second Pearson matrix is different than the first Pearson matrix, and wherein the fourth hash value identifies a communication link in the second one of the plurality of link aggregate groups along which the data unit is to be communicated that avoids polarization at corresponding link aggregate groups of the plurality of link aggregate groups; and
   transmitting, by the second network device, the data unit via the communication link in the second one of the plurality of link aggregate groups identified by the fourth hash value.

2. The method of claim 1, wherein applying the hashing function to the first hash input data and to the second hash input data includes:
   generating a first portion of the corresponding hash input data using fixed data;
   generating a second portion of the corresponding hash input data using user-defined data; and
   supplying the corresponding hash input data to the hashing function;
   wherein the corresponding hash input data includes at least a portion of the data unit.

3. The method of claim 2, wherein the corresponding hash input data further includes an identifier of an ingress port of the corresponding network device at which the data unit has been received.

4. The method of claim 2, wherein generating the first portion of hash input data using the fixed data includes applying a set of fixed offsets into respective sections of a header of the data unit.

5. The method of claim 2, wherein the data unit is associated with a plurality of communication protocol layers; wherein using the user-defined data includes:
   using a first field of the user-defined data to determine a header corresponding to a desired communication protocol layer of the data unit; and
   using a second field of the user-defined data to locate a portion in the header of the desired communication protocol layer of the data unit.

6. The method of claim 1, wherein generating the first hash input data and the second hash input data includes:
   selecting a mask indicative of which portions of the corresponding hash input data are to be used in generating the corresponding hash value; and
   applying the mask to the hash input data.

7. The method of claim 6, wherein selecting the mask is based on an ingress port at which the data unit was received.

8. The method of claim 6, wherein the data unit is a data packet associated with one of a plurality of packet types, and wherein selecting the mask is further based on the one of the plurality of packet types.

9. The method of claim 1, further comprising:
applying, at the first network device, the hashing function and the Pearson hash to a plurality of data units in a flow to generate fifth hash values, wherein the fifth hash values all identify a same communication link in the first one of the plurality of link aggregate groups along which the plurality of data units in the flow are to be communicated; and
applying, at the second network device, the hashing function and the Pearson hash to the plurality of data units in the flow to generate sixth hash values that are distinct from the fifth hash values, wherein the sixth hash values all identify a same communication link in the second one of the plurality of link aggregate groups along which the plurality of data units in the flow are to be communicated.

10. A load balancing network, comprising:
a first network device coupled to a second network device;
the first network device comprising:
  a first network interface configured to receive a data unit,
  a second network interface configured to transmit the data unit, wherein the second network interface is coupled to a first plurality of communication links corresponding to a first link aggregate group,
  one or more integrated circuits that implement:
    a first hash input selector configured to generate a first hash input data based on the data unit,
    a first hash value generator configured to apply a hash function to the first hash input data to generate a first hash value, including applying a first seed that is specific to the first network device,
    a first Pearson hash generator to generate a second hash value based on (i) the first hash value and (ii) a first Pearson matrix, and
    a first link selector configured to select, based on the second hash value, a first communication link in the first link aggregate group along which the data unit is to be communicated; and
the second network device comprising:
  a third network interface coupled to the first communication link and configured to receive the data unit,
  a fourth network interface configured to transmit the data unit, wherein the second network interface is coupled to a second plurality of communication links corresponding to a second link aggregate group,
  one or more integrated circuits that implement:
    a second hash input selector configured to generate a second hash input data based on the data unit,
    a second hash value generator configured to apply the hash function to the second hash input data to generate a third hash value distinct from the first hash value, including applying a second seed that is specific to the second network device and is different than the first seed,
    a second Pearson hash generator to generate a fourth hash value based on (i) the third hash value and (ii) a second Pearson matrix that is different than the first Pearson matrix, and
    a second link selector configured to select, based on the fourth hash value, a second communication link in the second link aggregate group along which the data unit is to be communicated that avoids polarization at corresponding link aggregate groups of the plurality of link aggregate groups.

11. The load balancing network of claim 10, wherein the first hash input selector is configured to select a first set of inputs to be included in the first hash input data according to a fixed scheme, and to select a second set of inputs according to a user-configurable scheme, wherein the first hash input data includes at least a portion of the data unit.

12. The load balancing network of claim 11, wherein the first hash input selector is configured to select an identifier of an ingress port at which the data unit was received in the hash input.

13. The load balancing network of claim 11, wherein the first hash input selector is configured to select the first set of inputs by applying a set of fixed offsets into respective sections of a header of the data unit.

14. The load balancing network of claim 11, wherein:
the data unit is associated with a plurality of communication protocol layers;
the first hash input selector is configured to:
  use a first field of the user-defined data to determine a header corresponding to a desired communication protocol layer of the data unit, and
  use a second field of the user-defined data to locate a portion in the header of the desired communication protocol layer of the data unit.

15. The load balancing network of claim 10, wherein the first hash input selector is configured to generate the first hash input data based at least in part on the data unit; and
wherein the first network device includes a mask selector configured to generate a mask indicative of which portions of first hash input data are to be used in generating the first hash value;
wherein the first hash input selector is configured to apply the mask to the first hash input data.

16. The load balancing network of claim 15, wherein the mask selector is configured to select the mask based on an ingress port at which the data unit was received.

17. The load balancing network of claim 15, wherein:
the data unit is a data packet associated with one of a plurality of packet types; and
the mask selector is further configured to select the mask based on the one of the plurality of packet types.

18. The load balancing network of claim 10, wherein:
the first hash value generator and the first Pearson hash generator are configured to collectively generate fifth hash values for a plurality of data units in a flow, wherein the fifth hash values all identify a same communication link in the first plurality of communication links along which the plurality of data units in the flow are to be communicated; and
the second hash value generator and the second Pearson hash generator are configured to collectively generate sixth hash values for the plurality of data units in the flow, wherein the sixth hash values all identify a same communication link in the second plurality of communication links along which the plurality of data units in the flow are to be communicated, the sixth hash values being distinct from the fifth hash values.

19. The load balancing network of claim 10, further comprising one or more other network devices coupled to at least one of the first network device and the second network device.

* * * * *